May 6, 1947. A. R. ADAMS 2,420,061
FASTENER
Filed May 28, 1945
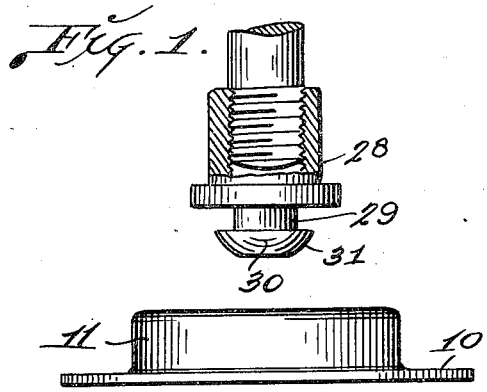
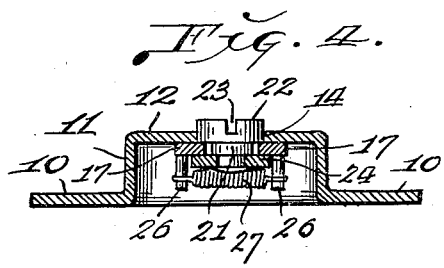
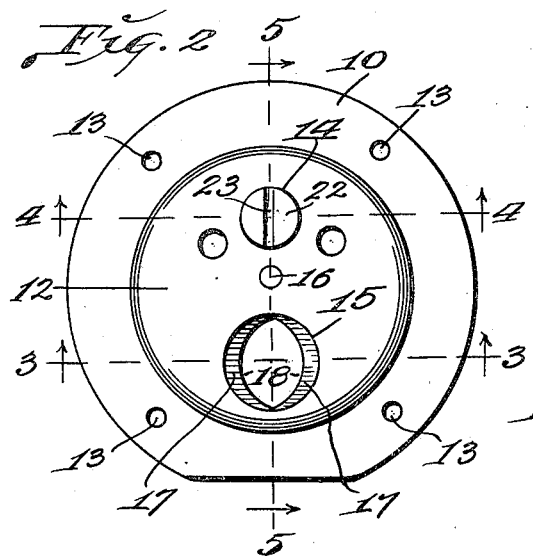
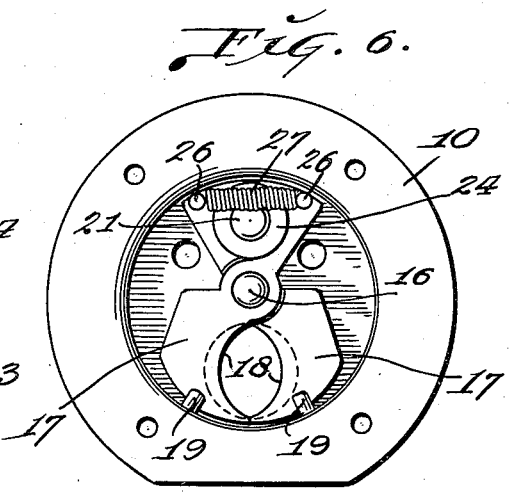
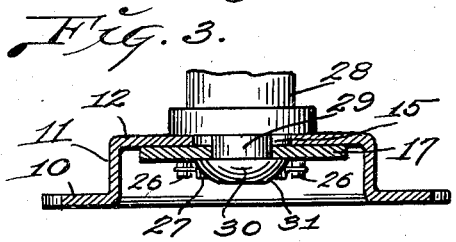
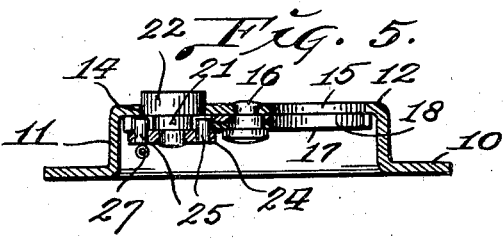
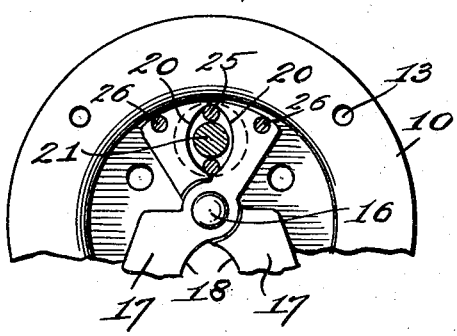
INVENTOR.
ARTHUR R. ADAMS.
BY
Martin P. Smith
ATTY.

Patented May 6, 1947

2,420,061

UNITED STATES PATENT OFFICE 2,420,061

FASTENER

Arthur R. Adams, Glendale, Calif.

Application May 28, 1945, Serial No. 596,290

4 Claims. (Cl. 85—5)

My invention relates to a connecting and fastening device of the particular type disclosed in my co-pending patent application filed December 18, 1943, Ser. No. 514,807, and application Ser. No. 519,118, filed January 21, 1944.

The principal objects of my present invention are to generally improve upon and simplify the construction of the connecting and fastening means forming the subject matter of my aforesaid co-pending applications, as well as other existing forms of similar connecting and fastening devices; further, to provide a fastener of simple, strong, compact and durable structure, which is quick acting in its closing function, capable of being easily and quickly released, and which may be advantageously employed for detachably securing chairs, tables and the like, to the floor, also for detachably connecting and securing parts of buildings, such as walls, floors, partitions, panels and the like, also for knock down structures such as boxes, cabinets and shelving, for cargo tie-downs and for the suspension of heavy pictures and the like.

A further object of my invention is to provide a device of the character referred to, having few operating parts of simple, sturdy structure, thus minimizing the possibility of failure of the device to function properly at all times.

With the foregoing and other objects in view, my invention consists in certain novel features of construction and arrangement of parts, which will be hereinafter more fully described and claimed and illustrated in the accompanying drawings, in which:

Fig. 1 is an elevational view, partly in section, of the two parts of my improved fastening device.

Fig. 2 is a plan view of the housing member of the device.

Fig. 3 is a cross section taken on the line 3—3 of Fig. 2, and showing the parts connected.

Fig. 4 is a cross section taken on the line 4—4 of Fig. 2.

Fig. 5 is a cross section taken on the line 5—5 of Fig. 2.

Fig. 6 is a plan view looking against the underside of the housing member.

Fig. 7 is a fragmentary view partly in section and looking against the underside of the housing.

Referring by numerals to the accompanying drawings, which illustrate a preferred embodiment of my invention, 10 designates a plate, preferably of metal, having its central portion pressed to form a shallow housing, comprising a circular wall 11 and top plate or wall 12. This plate 10 may be anchored to a floor or other element by means of screws which pass through apertures 13 formed in said plate near its margin.

Formed in plate 12 of the housing, on opposite sides of the center thereof and in diametric alignment, are apertures 14 and 15, which may differ in size as seen in Fig. 2.

Arranged for operation against the underface of plate 12, and pivotally mounted on a stud 16, seated in said plate between the apertures 14 and 15, is a pair of crossed arms 17, and formed in the inner edges of those portions of said arms which extend beneath aperture 15 are curved notches 18.

Under normal conditions, the width of the opening formed by the notches 18 is somewhat less than the diameter of aperture 15. (See Fig. 2.)

Studs 19, seated in housing wall 11, underlie those ends of the arms 17 having the notches 18, thus supporting said arms in proper operative position and counteracting any tendency of said arms to be forced away from the plate 12 as the stud portion of the fastener passes between said arms.

Those portions of arms 17 which overlie each other are reduced to half thickness, and thus the notched end portions of said arms occupy the same plane.

Formed in the inner edges of the opposite end portions of the arms 17, beneath aperture 14, are curved notches 20, and passing therethrough is the intermediate portion of a rotary stud 21, the upper end of which is enlarged to form a head 22, which occupies said aperture. Formed in the outer face of head 22 is a slot 23, for the reception of the point of a screw driver or like tool.

Secured to the lower end of stud 21 below the ends of the arms 17, having the notches 20, is a disc 24, and projecting upwardly therefrom at diametrically opposite points are pins 25 which, as stud 21 is rotated, bear on the edges of said curved notches and swing said arms on their axis, the stud 16.

Depending from the ends of the arms 17, having the notches 20, are pins 26, to which are connected the ends of a retractile coil spring 27.

The complementary member of the connection and fastener comprises a stud 28, which may be suitably anchored to an element such as a chair, table, wall, panel or the like, and connected to said stud by a neck portion 29 is a head 30 having a rounded or bevelled lower edge 31. The diameter of head 30 is such that it will just pass through aperture 15, and the diameter of neck 29 is equal to or slightly less than the width of the opening formed by notches 18.

To connect the parts of the fastener, the member which carries stud 28 is manipulated so as to move head 30 through aperture 15, and as the curved lower edge 31 of said head engages the curved edges of notches 18 the ends of the arms will be spread apart until said head passes below said arms, whereupon the spring 27 acts to return the arms to their normal positions with portions of said arms adjacent the notches 18 positioned around the neck 29 above head 30, thus effectively securing the connected parts to each other. (See Fig. 3.)

To disconnect the parts of the fastener, stud 21 is rotated in either direction approximately ninety degrees, by the application of a screw driver or the like, to slot 23 in head 22, thereby causing pins 25 to bear against the edges of the curved notches 20 so as to swing the ends of the arms apart, thus enabling head 30 to be withdrawn from engagement with notches 18 through aperture 15.

The ends of arms 17, provided with notches 18, have considerable width, and such provision, with the plate 12, affords two thicknesses of metal to resist pulling strains impressed on stud 28 and which tend to withdraw head 30 from the housing member of the device.

Thus it will be seen that I have provided a connecting and fastening device which is simple in construction, inexpensive of manufacture and very effective in performing the functions for which it is intended.

It will be understood that minor changes in the size, form and construction of the various parts of my improved fastening device may be made and substituted for those herein shown and described, without departing from the spirit of my invention, the scope of which is set forth in the appended claims.

I claim as my invention:

1. A fastener device comprising a plate provided with a stud-receiving aperture, a pair of crossed arms pivotally connected intermediate their ends and mounted on the under side of the plate with portions of the free ends of said arms underlying the plate aperture, and means rotatably mounted in the plate spaced substantially from the stud-receiving aperture to engage the end portions of said arms on the side of the fulcrum pivot opposite the ends underlying the plate aperture for simultaneously spreading opposite ends of said arms to release a stud engaged in said plate aperture.

2. A fastener device comprising a plate member provided with a stud-receiving opening, a pair of crossed arms pivotally mounted in the under side of said plate, said arms presenting at their opposite ends opposed stud-engaging jaws disposed in a common plane and actuating jaws disposed in a common plane with superposed bearing portions intermediate their ends and surrounding the pivotal connection with the plate, and rotary means mounted in the plate above the actuator jaws and having eccentric portions disposed between said co-planar actuating jaws and adapted upon turning movement to spread said actuating jaws and simultaneously the stud-engaging jaws disposed below the plate aperture on the opposite side of the fulcrum pivot.

3. A fastener device comprising a plate member provided with a stud-receiving opening, a pair of levers pivoted to the under side of said plate member and presenting coplanar jaw portions underlying said plate opening, means mounted in the cover remote from the cover opening and the pivot connection of the arms thereto for effecting spreading of the jaw portions of said arms, said means comprising a rotary member having an actuating head accessible on the upper face of said plate and a disc member underlying portions of said levers, fingers rotatable with said stud and disposed between said levers for effecting a spreading thereof, and coil spring means connecting said levers in the region of said disc.

4. A fastener device comprising a plate member provided with a stud-receiving aperture, a pair of levers of the first class mounted on the under side of said plate and having a fulcrum pivot adjacent said plate opening, one end of said levers presenting opposed stud-engaging jaws underlying said opening and the opposite end of said levers presenting actuating jaws spaced from said opening on the opposite side of the fulcrum pivot, and rotary means mounted in the cover and having an operative connection below the cover with the actuating jaws whereby rotation of said rotary means will effect operation of said actuating jaws and opening of the stud-engaging jaws to release a stud from said opening.

ARTHUR R. ADAMS.

REFERENCES CITED

The following references are of record in the file of this patent:

UNITED STATES PATENTS

| Number | Name | Date |
|---|---|---|
| 146,829 | Lindsay | Jan. 27, 1874 |

FOREIGN PATENTS

| Number | Country | Date |
|---|---|---|
| 733,858 | French | July 18, 1932 |